Sept. 20, 1927.
R. E. BROWN
1,642,988
SAFETY DEVICE FOR TRAVELING STRUCTURES
Filed Feb. 19, 1927
2 Sheets-Sheet 1
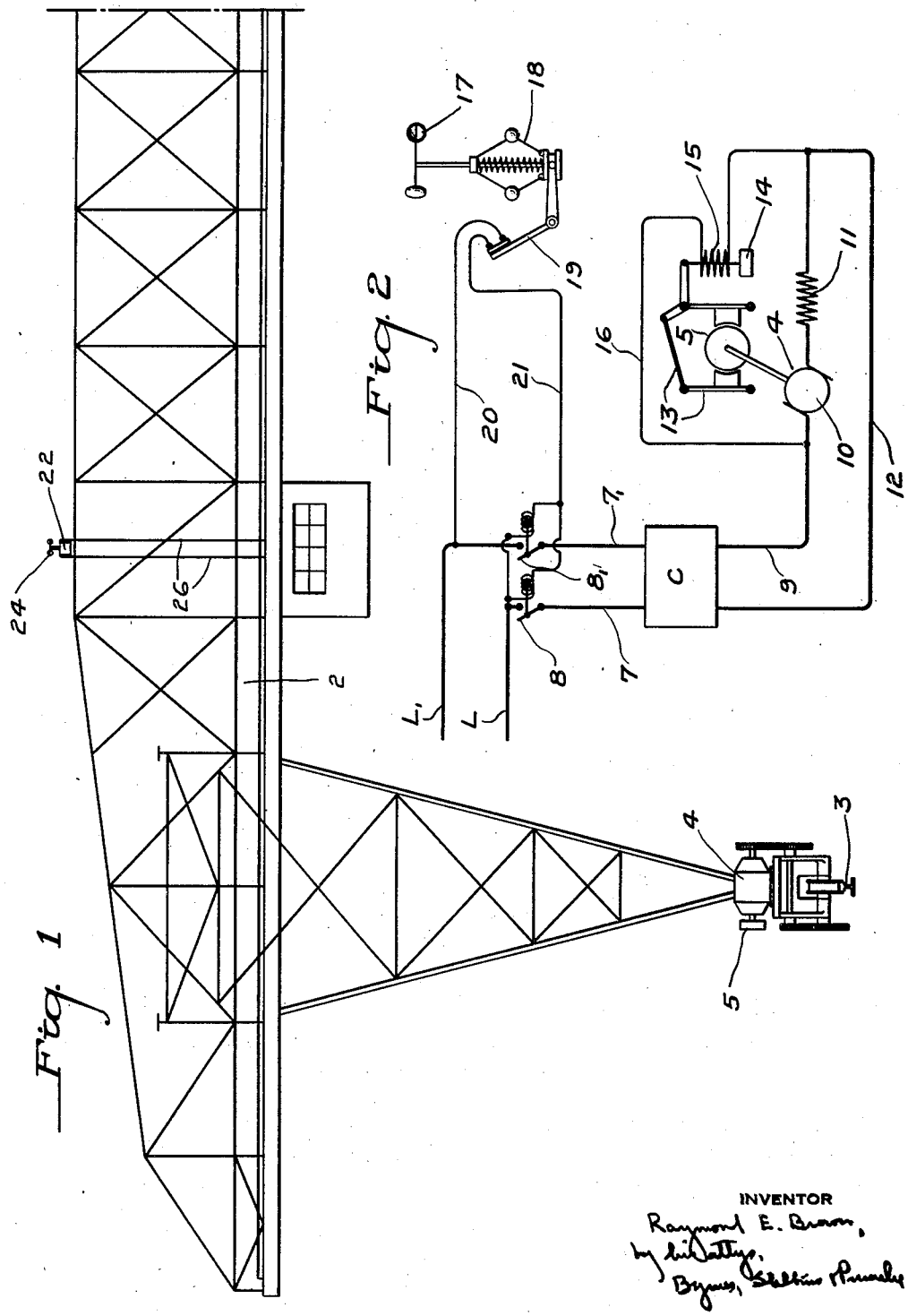
INVENTOR
Raymond E. Brown, Sept. 20, 1927.
R. E. BROWN
1,642,988
SAFETY DEVICE FOR TRAVELING STRUCTURES
Filed Feb. 19, 1927    2 Sheets-Sheet 2
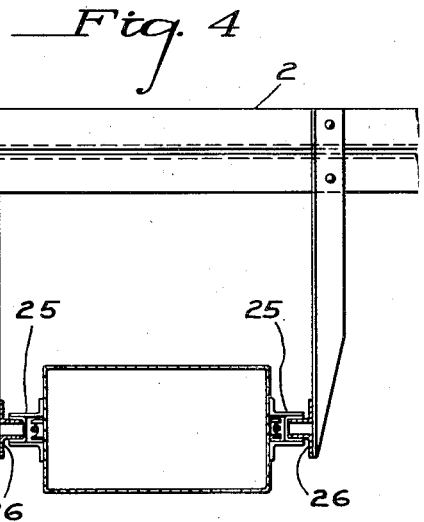
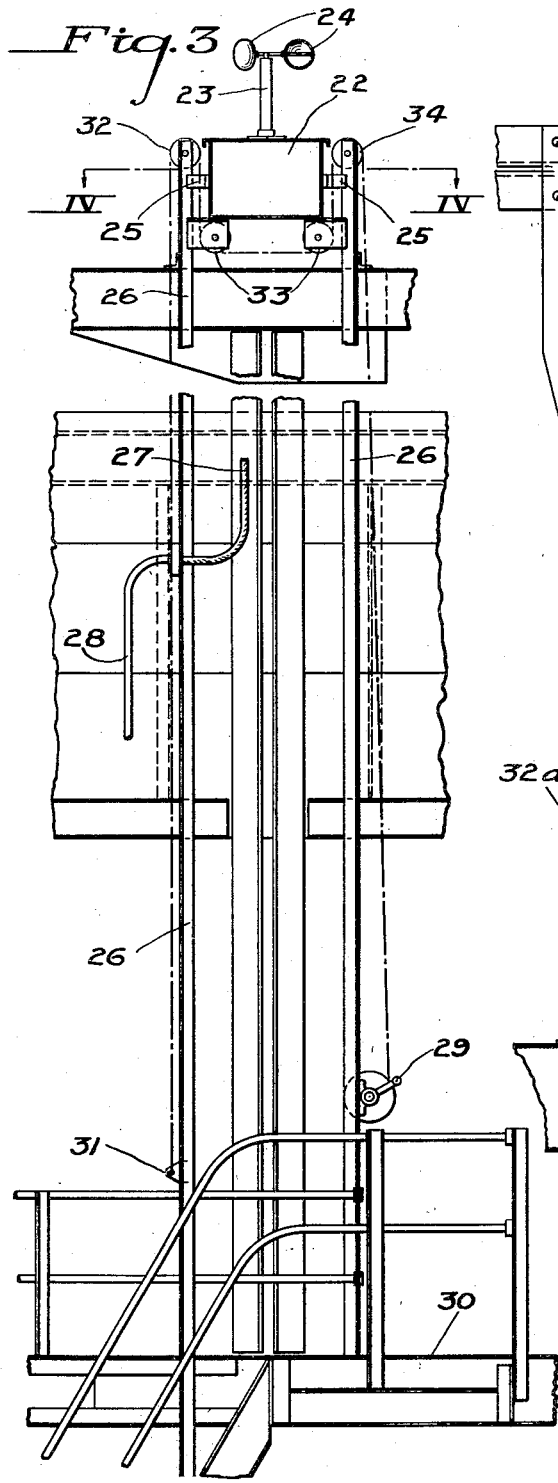
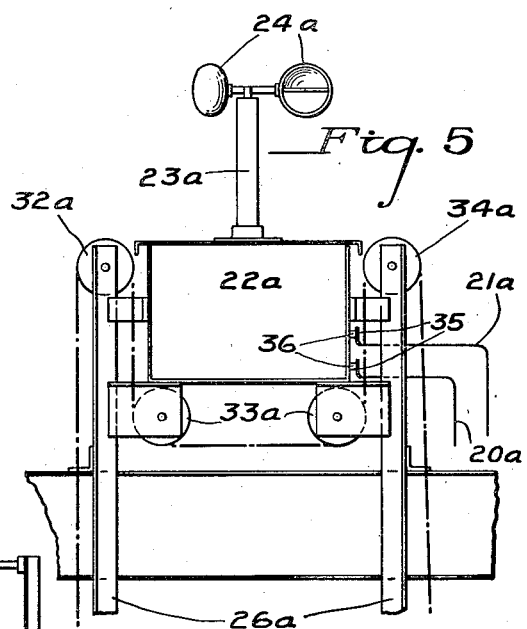
INVENTOR
Raymond E. Brown Patented Sept. 20, 1927.

1,642,988

UNITED STATES PATENT OFFICE.

RAYMOND B. BROWN, OF PITTSBURGH, PENNSYLVANIA, ASSIGNOR TO HEYL & PATTERSON, INC., OF PITTSBURGH, PENNSYLVANIA, A CORPORATION OF PENNSYLVANIA.

SAFETY DEVICE FOR TRAVELING STRUCTURES.

Application filed February 19, 1927. Serial No. 169,558.

This invention relates to a safety device for traveling structures such as ore bridges, traveling docks or traveling cranes.

Traveling structures of this character are 5 always provided with brakes so as to lock the structure when desired. Such structures are subject to very high wind loads and it is essential to hold the structure against movement if the wind rises above a dangerous 10 velocity. Various safety means employing wind responsive devices have been employed. An example of such devices is shown in my prior Patent No. 1,593,427, dated July 20th, 1926.

15 It is desirable that the wind actuated device be mounted on top of the traveling structure in order that it shall be effective. This makes it difficult to reach the device for inspection or repair, and manufacturers have been put to the expense of providing special ladders for this purpose. The devices are likely to freeze up in bad weather, and for this reason, as well as many others, it is desirable that they be inspected frequently.

I provide a wind actuated safety device which is movable relative to the traveling structure. This capability of movement makes it possible for an operator to shift the position of the device from the elevated point which it normally occupies on the traveling structure and inspect or repair it conveniently. I preferably employ vertically extending guides and a hoist whereby the wind actuated device may be shifted from its normal position to a position adjacent an operator's platform. The movable device preferably carries electrical contacting means so that only an electrical connection is required. This does away with complicated mechanical parts and also makes it possible to provide an additional safety means. I provide electrical connections of such character that if the safety device is out of the desired position, the traveling structure will be held against movement.

In the accompanying drawings which illustrate more or less diagrammatically the present preferred embodiment of the invention, Figure 1 is a diagrammatic view of a portion of a traveling crane, showing the invention applied thereto, Figure 2 is a wiring diagram, Figure 3 is a view to enlarged scale showing the guides in which the safety device is mounted, Figure 4 is a section taken on the line IV—IV of Figure 3 showing the guides, and Figure 5 is a view showing a modified structure wherein the wind actuated device makes or breaks electrical connections upon movement of the device relative to traveling structures.

Referring first to Figures 1 to 4 inclusive, there is shown a traveling bridge indicated generally by the reference character 2. The bridge runs on rails 3 and is driven through gearing by motors 4. Each motor is provided with a brake 5 which is set whenever the motor circuit is opened.

The circuit for the motor 4 is shown in Figure 2. Current is supplied through line wires L and $L_1$. A wire 7 having a magnetically closed contactor 8 therein leads to a motor control panel C. Similarly a wire $7_1$ containing a contactor $8_1$ leads from the line $L_1$ to the control panel C. A wire 9 leads to the armature 10 of the motor 4, thence through the field coil 11 and back to the control panel through a wire 12. The brake 5 is constantly urged to closed position through links 13 by a weight 14. The brake is opened by a coil 15 lying in a shunt circuit 16. When current is supplied to the motor the coil 15 is energized and releases the brake 5. Whenever the motor circuit is broken the weight sets the brake and prevents the bridge from traveling.

The contactors 8 and $8_1$ are controlled by an anemometer 17 connected to a centrifugal governor 18. This apparatus is of the general character illustrated in my prior patent above referred to. The centrifugal governor operates an arm 19 which makes or breaks a circuit through wires 20 and 21. The wires 20 and 21, and the contact points on the arm 19, form part of a shunt circuit controlling the magnetic coils of the contactors 8 and $8_1$. If the velocity of the wind becomes excessive the contacts controlled by the arm 19 are opened, thus setting the brake 5.

Figures 3 and 4 show the mounting of the anemometer on the traveling bridge. The governor and its associated mechanism is carried in a box 22 having an upstanding post 23. The anemometer cups 24 are mounted at the top of the post. The shaft extends through the post and carries the governor 18.

The box 22 is provided with guide shoes 25 engaging vertically extending guides 26 carried by the crane structure. A flexible electrical cable 27 extends from a conduit 28 to the box 22 and carries the control wires 20 and 21.

The box 22 may be hoisted or lowered by a winch 29 positioned adjacent an operator's platform 30. The hoisting cable is dead-ended at 31. It extends upwardly over a sheave 32, thence around sheaves 33 on the box 22, thence over another elevated sheave 34 and thence downwardly to the winch 29. This arrangement is desirable because it permits of renewing the cable without climbing to the top of the bridge. When it is desired to renew a cable the new cable is attached to one end of the old cable and the old cable is then pulled down until the new one is in its place.

Referring to Figure 4 it will be noted that the guides are so positioned that they do not lie within the circle swept out by the anemometer cups. This is desirable because it permits of lowering the device even though the anemometer is spinning.

Figure 5 shows a modified structure wherein control wires $20_a$ and $21_a$ terminate in contacts 35 at the top of one of the guides $26_a$. The box $22_a$ carries corresponding contacts 36. The contacts 36 are connected to the terminals in the box $22_a$ so that when the box is in its elevated position the control circuit will be established. If the box $22_a$ is lowered the control circuit will be broken, thus opening the contactors 8 and $8_1$, and holding the bridge against movement. It will be impossible to move the bridge until the box $22_a$ is again hoisted to its elevated position.

The sheaves 32 and 34 act as stops to prevent the box 22 or $22_a$ from being lifted out of its guides.

I have illustrated and described the present preferred form of my invention and one modification thereof, but it will be understood that the invention is not limited to this form alone, as it may be otherwise embodied within the scope of the following claims:

I claim:—

1. In combination with a traveling structure, a wind actuated control device, the device being movable relative to the traveling structure.

2. In combination with a traveling structure, a wind actuated control device, the device being movable in a vertically extending direction.

3. In combination with a traveling structure, guides mounted on the structure and a wind actuated control device movable in the guides.

4. In combination with a traveling structure, guides mounted on the structure, a wind actuated control device movable in the guides, and means for moving the device in the guides.

5. In combination with a traveling structure, vertically extending guides mounted on the structure, a wind actuated control device movable in the guides and a hoist for the device.

6. In combination with a traveling structure, guides mounted on the structure, the guides extending to a point above the structure, and a wind actuated control device movable in the guides.

7. In combination with a traveling structure, guides mounted on the structure, and a wind actuated control device movable in the guides, the guides extending to such position that the wind actuated portion of the device may lie above the structure.

8. In combination with a traveling structure, a wind actuated control device, the device being movable relative to the traveling structure, and electrical connections leading to the movable control device.

9. In combination with a traveling structure, guides mounted on the structure, and a wind actuated control device movable in the guides, the wind actuated device having a rotatable portion, the guides lying clear of the circuit swept out by such rotatable portion.

10. In combination with a traveling structure, a wind actuated control device, the device being movable relative to the traveling structure, and electrical contacts adapted to form part of a circuit when the device is at a desired position relative to the traveling structure.

11. In combination with a traveling structure, a wind actuated control device, the device being movable relative to the traveling structure, and an electric control circuit effective for preventing movement of the traveling structure when the circuit is broken, the circuit extending through the wind actuated device, the circuit having contacts adapted to break the electrical connection if the device is not in a desired position relative to the traveling structure.

12. In combination with a traveling structure, vertically extending guides, a wind actuated control device movable in the guides and a flexible cable for hoisting the wind actuated device, the cable extending upwardly to a support, then into engagement with the device, then into engagement with an elevated support and then downwardly to an operative position.

13. In combination with a traveling structure, vertically extending guides, a wind actuated control device movable in the guides, and a flexible cable for hoisting the device, the cable having both ends lying below the operative position of the device, a bight of the cable extending upwardly over guide means and into engagement with the device.

In testimony whereof I have hereunto set my hand.

RAYMOND E. BROWN.